(12) United States Patent
El Osta

(10) Patent No.: US 9,264,292 B2
(45) Date of Patent: Feb. 16, 2016

(54) SYSTEM AND METHOD FOR ENHANCED ADDRESS RESOLUTION

(75) Inventor: Mohamad Imad El Osta, Vienna, VA (US)

(73) Assignee: Sybase 365, Inc., Reston, VA (US)

( * ) Notice: Subject to any disclaimer, the term of this patent is extended or adjusted under 35 U.S.C. 154(b) by 835 days.

(21) Appl. No.: 12/560,567

(22) Filed: Sep. 16, 2009

(65) Prior Publication Data

US 2010/0226488 A1  Sep. 9, 2010

Related U.S. Application Data

(60) Provisional application No. 61/097,296, filed on Sep. 16, 2008.

(51) Int. Cl.
G06F 15/16 (2006.01)
G06F 21/00 (2013.01)
H04M 1/64 (2006.01)
H04L 29/12 (2006.01)

(52) U.S. Cl.
CPC ...... *H04L 29/1216* (2013.01); *H04L 29/12132* (2013.01); *H04L 61/157* (2013.01); *H04L 61/1552* (2013.01)

(58) Field of Classification Search
CPC .. H04L 29/12009; H04L 63/083; G06F 21/31
USPC ........................................................ 709/245
See application file for complete search history.

(56) References Cited

U.S. PATENT DOCUMENTS

2004/0243719 A1* 12/2004 Roselinsky ................... 709/245
2009/0265559 A1* 10/2009 Hwang ......................... 713/183

* cited by examiner

*Primary Examiner* — Phuoc Nguyen
*Assistant Examiner* — Kishin G Belani
(74) *Attorney, Agent, or Firm* — Kenyon & Kenyon LLP

(57) ABSTRACT

As Mobile Subscribers increasingly employ their Wireless Devices to perform an ever expanding array activities an element that may reside in various portions of a messaging infrastructure and which efficiently and flexibly supports enhanced message address resolution capabilities.

16 Claims, 11 Drawing Sheets

```
public   static final long   MIN_LONG_VALUE   = 1L;
public   static final long   MAX_LONG_VALUE   = 0x3FFFFFFFFFFFFL;
public   static final short  MIN_SHORT_VALUE  = 0;
public   static final short  MAX_SHORT_VALUE  = 0x3FFF;
private  static final long   serialVersionUID = 1692249953902594448L;
private  static final long   VALUE_MASK       = 0x3FFFL;
private  static final long   EMPTY_TABLE_SLOT = 0L;
private  static final long   EMPTY_KEY        = 0L;
public   static final short  INVALID_VALUE    = -1;
private  static final int    KEY_RIGHT_SHIFT  = 14;
private  static final int    INDEX_NOT_FOUND  = -1;
private  static final int    EMPTY_TABLE      = 0;
```

FIG. 5

```
private long[] table;
private int    size;
private int    capacity;
```
(602)

FIG. 6

```
public FastHashTable(int desiredCapacity)
{
      capacity = nextPrime(desiredCapacity);
      init();
}
private void init()
{
      table = new long[capacity];
      size  = EMPTY_TABLE;
}
```

FIG. 7

```
public boolean put(long key, short value)
{
      for(int i = 0; i < table.length; i++)
      {
            int index = doubleHash(key, i);
            long nextKey = getKey(index);
            if(nextKey == EMPTY_KEY)
            {
               table[index] = (key << KEY_RIGHT_SHIFT) + value;
               size++;
               return true;
            }
            else if(nextKey == key)
            {
               table[index] = (key << KEY_RIGHT_SHIFT) + value;
               return true;
            }
      }
}
```

FIG. 8

```
public short get(long key)
{
    int index = getIndex(key);
    if(index > INDEX_NOT_FOUND)
        return getValue(index);
    return INVALID_VALUE;
}
```

```
public boolean containsKey(long key)
{
      return get(key) != INVALID_VALUE;
} public boolean isEmpty()
{
      return size == EMPTY_TABLE;
} public void clear()
{
      init();
} public int size()
{
      return size;
} private int getIndex(long key)
{
      for(int i = 0; i < table.length; i++)
      {
            int index = doubleHash(key, i);
            long indexKey = getKey(index);
            if(indexKey == key)
                  return index;
            else if(table[index] == EMPTY_TABLE_SLOT)
                  return INDEX_NOT_FOUND;
      }
      return INDEX_NOT_FOUND;
} private short getValue(int index)
{
      return (short)(table[index] & VALUE_MASK);
} private long getKey(int index)
{
      long key = table[index] >>> KEY_RIGHT_SHIFT;
      return key;
}
```

FIG. 10

```
private CacheEntry getEntry(int index)
{
    return new CacheEntry(index, getKey(index), getValue(index));
} private boolean isKeyValid(long key)
{
    return key >= MIN_LONG_VALUE && key <= MAX_LONG_VALUE;
} private boolean isValueValid(short value)
{
    return value >= MIN_SHORT_VALUE && value <= MAX_SHORT_VALUE;
} private int nextPrime(int number)
{
    return BigInteger.valueOf(number).nextProbablePrime().intValue();
} private int firstHash(long key)
{
    return (int)(key % table.length);
} private int secondHash(long key)
{
    return 1 + (int)(key % (table.length - 1));
} private int doubleHash(long key, int index)
{
    return (firstHash(key) + index * secondHash(key)) % table.length;
}
```

FIG. 11

```
.
.
.
Trying to add a key-value pair to the CAR: key=100002 value=13
Hash number 1 for key 100002 is 1
Key at index 1 is 0
Successfully added key-value pair at index 1
.
.
.
Trying to add a key-value pair to the CAR: key=999930 value=22
Hash number 1 for key 999930 is 8
Key at index 8 is 300000
Hash number 2 for key 999930 is 9
Key at index 9 is 599982
Hash number 3 for key 999930 is 10
Key at index 10 is 799960
Hash number 4 for key 999930 is 0
Key at index 0 is 200002
Hash number 5 for key 999930 is 1
Key at index 1 is 100002
Hash number 6 for key 999930 is 2
Key at index 2 is 0
Successfully added key-value pair at index 2
.
.
.
```

FIG. 12

```
.
.
.
Trying to get the value from the CAR for key=100002
Finding index in CAR for key 100002
Hash number 1 for key 100002 is 1
Key at index= 1 is 100002
Successfully found key 100002 at index 1
Value at index 1 is 13
.
.
.
Trying to get the value from the CAR for key=999930
Finding index in CAR for key 999930
Hash number 1 for key 999930 is 8
Key at index 8 is 300000
Hash number 2 for key 999930 is 9
Key at index 9 is 599982
Hash number 3 for key 999930 is 10
Key at index 10 is 799960
Hash number 4 for key 999930 is 0
Key at index 0 is 200002
Hash number 5 for key 999930 is 1
Key at index 1 is 100002
Hash number 6 for key 999930 is 2
Key at index 2 is 999930
Successfully found key 999930 at index 2
Value at index 2 is 22
.
.
.
```

FIG. 13

SYSTEM AND METHOD FOR ENHANCED ADDRESS RESOLUTION

This application claims the benefit of U.S. Provisional Patent Application Ser. No. 61/097,296, filed on 16 Sep. 2008, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), Internet Protocol (IP) Multimedia Subsystem (IMS), etc.

2. Background of the Invention

As the 'wireless revolution' continues to march forward the importance to a Mobile Subscriber (MS)—for example a user of a Wireless Device (WD) such as a mobile telephone, a BlackBerry, a computer, etc. that is serviced in some way by a Wireless Carrier (WC)—of their WD grows substantially.

One consequence of the growing importance of WDs is the resulting ubiquitous nature of WDs—i.e., MSs carry them at almost all times and use them for an ever-increasing range of activities.

Over the past many years various factors (including the ubiquitous nature of WDs) have driven a steady annual increase, year over year, in the number of SMS, MMS, etc. messages that have been exchanged by and between WDs. That steady increase shows no sign of abating. For example, as reported by the industry group CTIA (see ctia.org on the World Wide Web) in the U.S. there were over 363 billion SMS messages sent during 2007 (up from 158 billion SMS messages sent during 2006) and there were over 2.7 billion MMS messages sent during 2006 (representing a 100% increase over 2005).

As the volume of SMS, MMS, etc. messaging has increased in the past, and at present continues to increase, it has become more and more important for all of the different entities that process messages—e.g., WCs, intermediaries, enterprises, Content Providers (CPs), Service Providers (SPs), etc.—to route messages in the most efficient, expeditious, flexible, etc. manner possible.

A message may contain among other things a destination address—i.e., the address to where the message should be delivered—e.g., for a Peer-to-Peer (P2P) SMS message perhaps the Telephone Number (TN) of the recipient MS' WD; for an Application-to-Peer (A2P) SMS message perhaps a Short Code (SC) that is associated with a particular service (such as for example an advertising campaign); etc.

The routing of a message may involve a number of operations including possibly inter alia the resolution of the message's destination address—i.e., the authoritative identification of the entity (e.g., WC, landline carrier, etc.) that, at the moment that the message is being routed, services or that is otherwise associated with the address.

In the past the resolution of a message's address may have entailed multiple (possibly inter alia expensive, time-consuming, etc.) lookup operations against one or more internal and/or external data repositories. Worldwide the introduction of Mobile Number Portability (MNP) regimes, Number Resource Optimization (NRO) programs such as TN pooling, etc. complicated significantly the operation, administration, etc. of such lookup operations. Additionally, in high message traffic environments the resolution of a message's address may have employed specialized (e.g., large data set, high volume, etc.) facilities such as for example IBM's Transaction Processing Facility (TPF).

The challenges that were described above highlight the need for a more generalized infrastructure that offers, possibly among other things, enhanced address resolution capabilities.

The present invention provides such an infrastructure and addresses various of the (not insubstantial) challenges that are associated with same

SUMMARY OF THE INVENTION

One embodiment of the present invention offers a method for resolving an address wherein (a) a message address is received, (b) various processing steps are completed including passing the message address through a double hash operation, with open addressing for collision resolution, yielding a reference, (c) using the reference to directly retrieve from an address repository an entry for the message address; and (d) recovering from the retrieved entry an identity of an entity (e.g., WC) that services the message address.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

FIG. 5 through FIG. 11 present Java™ programming language code samples that may be possible under one particular embodiment of aspects of the present invention.

FIG. 12 and FIG. 13 present application program log file snippets that may be possible under one particular embodiment of aspects of the present invention.

Figure 1:
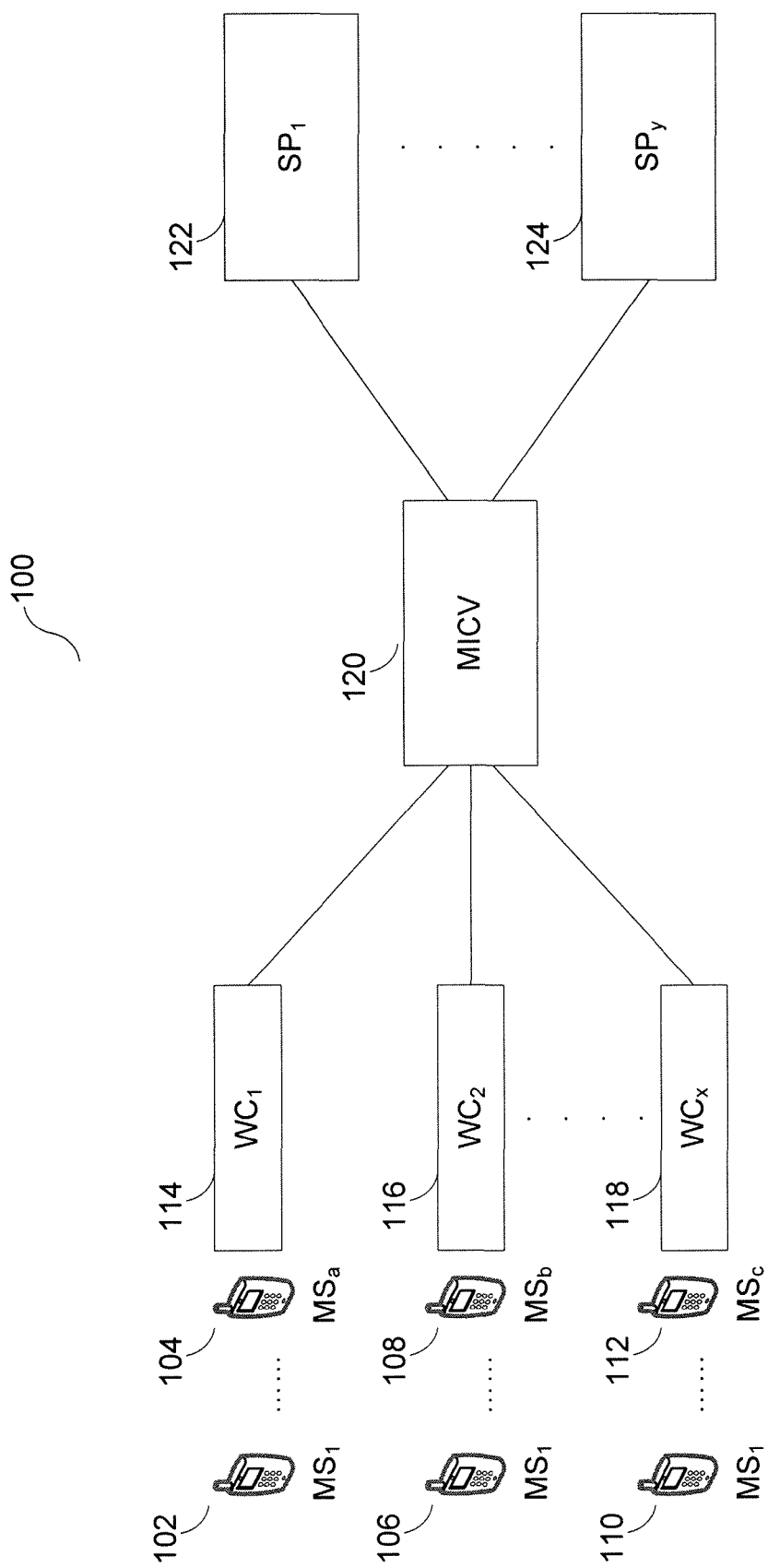
FIG. 1 is a diagrammatic presentation of an exemplary Messaging Inter-Carrier Vendor (MICV).

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention.

Note that in this description references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

Under one embodiment, aspects of the present invention may form an integral part of a MPI (which may among other things support the expeditious resolution of message addresses) within possibly inter alia a MICV.

Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same.

As illustrated in FIG. 1 and reference numeral 100 a MICV 120 is disposed between, possibly inter alia, multiple WCs ($WC_1$ 114, $WC_2$ 116,→$WC_x$ 118) on one side and multiple SPs ($SP_1$ 122→$SP_y$ 124) on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion above referenced a MICV it will be obvious to one or ordinary skill in the art that aspects of the present invention may be found within any of the various entities that process messages—for example possibly inter alia WCs, intermediaries (such as a MICV), enterprises, CPs, SPs, etc.

Figure 2:
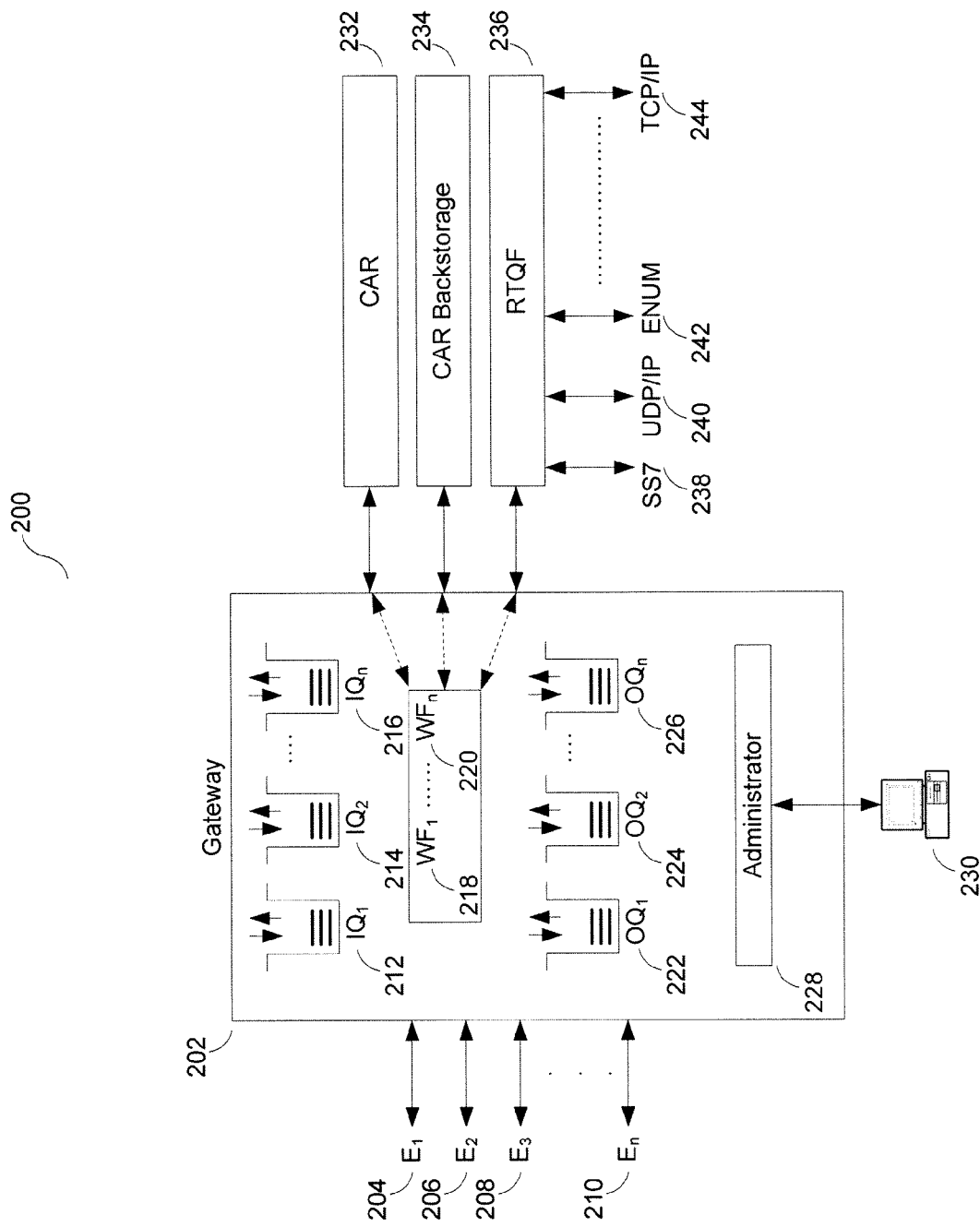
FIG. 2 is a diagrammatic presentation of an exemplary Message Processing Infrastructure (MPI).

To help illustrate aspects of the present invention consider the simplified MPI that is presented in FIG. 2 and reference numeral 200. Aspects of a MPI may exist within any or all of, possibly inter alia, a MICV, a WC, an enterprise, a SP, a CP, etc. In brief a MPI may interact with Entities ($E_1$ 204, $E_2$ 206, $E_3$ 208→$E_n$ 210), such as possibly inter alia elements or components of a MICV or a WC or an enterprise or a CP or a SP or a etc., to:

1) Receive incoming SMS, MMS, etc. messages over any combination of one or more communication paradigms or channels (including, possibly inter alia, IP, Signaling System Number 7 [SS7], etc.).

2) Process and route the messages (more about this below).

3) Send outgoing SMS, MMS, etc. messages over any combination of one or more communication paradigms or channels (including, possibly inter alia, IP, SS7, etc.)

Of interest and note in FIG. 2 are:

1) A Gateway 202. Behind the façade of a single consolidated Gateway 202 a dynamically updateable set of one or more software processes running on one or more computer hardware devices (not explicitly depicted in the diagram) handle incoming traffic and outgoing traffic. Incoming traffic is accepted and deposited on an intermediate or temporary Incoming Queue ($IQ_1$ 212, $IQ_2$ 214→$IQ_n$ 216 in the diagram) for subsequent processing. Processed artifacts are removed from an intermediate or temporary Outgoing Queue ($OQ_1$ 222, $OQ_2$ 224→$OQ_n$ 226 in the diagram) and then dispatched.

2) Incoming Queues ($IQ_1$ 212→$IQ_n$ 216). A dynamically updateable set of one or more IQs operate as intermediate or temporary buffers for incoming traffic.

3) WorkFlows ($WF_1$ 218→$WF_n$ 220). A dynamically updateable set of one or more WFs remove incoming traffic from an intermediate or temporary IQ (e.g., $IQ_1$ 212→$IQ_n$ 216), perform all of the required processing operations, and deposit processed artifacts on an intermediate or temporary OQ (e.g., $OQ_1$ 222→$OQ_n$ 226). The WorkFlow component will be described more fully below.

4) Outgoing Queues ($OQ_1$ 222→$OQ_n$ 226). A dynamically updateable set of one or more OQs operate as intermediate or temporary buffers for outgoing traffic.

5) A Real-Time Query Facility (RTQF) 236. When it is necessary to retrieve information about a destination address (e.g., a destination TN) a RTQF 236 may employ any combination of one or more channels such as SS7 238, User Datagram Protocol (UDP)/IP 240, Electronic Numbering (ENUM) 242, Transmission Control Protocol (TCP)/IP 244, etc. to query one or more sources (including possibly inter alia publicly-available repositories, administrative or regulatory bodies [such as for example the North American Numbering Plan {NANP} Administration {NANPA}, WCs, landline carriers, etc.) to complete such retrievals. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of how such a facility may provide, possibly among other things, support for the authoritative determination of a servicing WC given a TN (a) for any country (i.e., any TN numbering scheme) around the world and (b) that fully accounts for complexities such as MNP and NRO regimes.

6) A CAR 232. A consolidated repository that maintains, possibly inter alia, raw, processed, etc. authoritative address resolution data. A CAR 232 may leverage a 'backstorage' repository 234 for possibly inter alia interim, long-term, etc. storage.

7) An Administrator 228. An Administrator provides, possibly inter alia, management or administrative control over all of the different system components (e.g., IQs [$IQ_1$ 212→$IQ_n$ 216], WFs [$WF_1$ 218→$WF_n$ 220], OQs [$OQ_1$ 222→$OQ_n$ 226], CAR 232, CAR Backstorage 234, RTQF 236, etc.), a facility through which configuration information (for, possibly inter alia, one or more system components) may be dynamically updated, etc. An Administrator may provide, as one example, a Web-based interface 230; it will be readily apparent to one of ordinary skill in the relevant art that numerous other interfaces (e.g., a data feed, an Application Programming Interface [API], etc.) are easily possible.

Under one embodiment, aspects of the present invention may form an integral part of a MPI and support the resolution of TNs. Such an embodiment may, possibly inter alia, accept as input a TN (as for example the destination address of a message) and return as output a value that identifies the carrier (e.g., WC, landline carrier, etc.) that, at that moment in time, services or that is otherwise associated with the TN.

Such an embodiment may leverage the E.164 recommendation from the International Telecommunication Union (ITU). The E.164 recommendation describes a worldwide public telecommunication numbering plan and defines the particulars (e.g., format, etc.) of an individual TN. Among other things the E.164 recommendation:

1) Divides the world into geographic regions or zones:

| Zone | Description |
| --- | --- |
| 1 | North America |
| 2 | Africa |
| 3 | Europe |
| 4 | Europe |
| 5 | South America |
| 6 | Australia, etc. |
| 7 | USSR |
| 8 | Eastern Asia |
| 9 | Western Asia, Middle East |

2) Indicates that the first digit of an E.164-compliant TN's will identify the TN's geographic zone. For example, the first digit of the E.164-compliant TN 17035551234 is one indicating that the TN resides in North America (geographic zone 1). As well, the first digit of the E.164 compliant TN 442074841338 is four indicating that the TN resides in Europe (geographic zone 4).

3) Defines the maximum length of a TN as 15 digits.

Consequently the universe of E.164-compliant TNs is bounded by the theoretical maximum size of 10^15 or 1,000,000,000,000,000 TNs.

Figure 3:
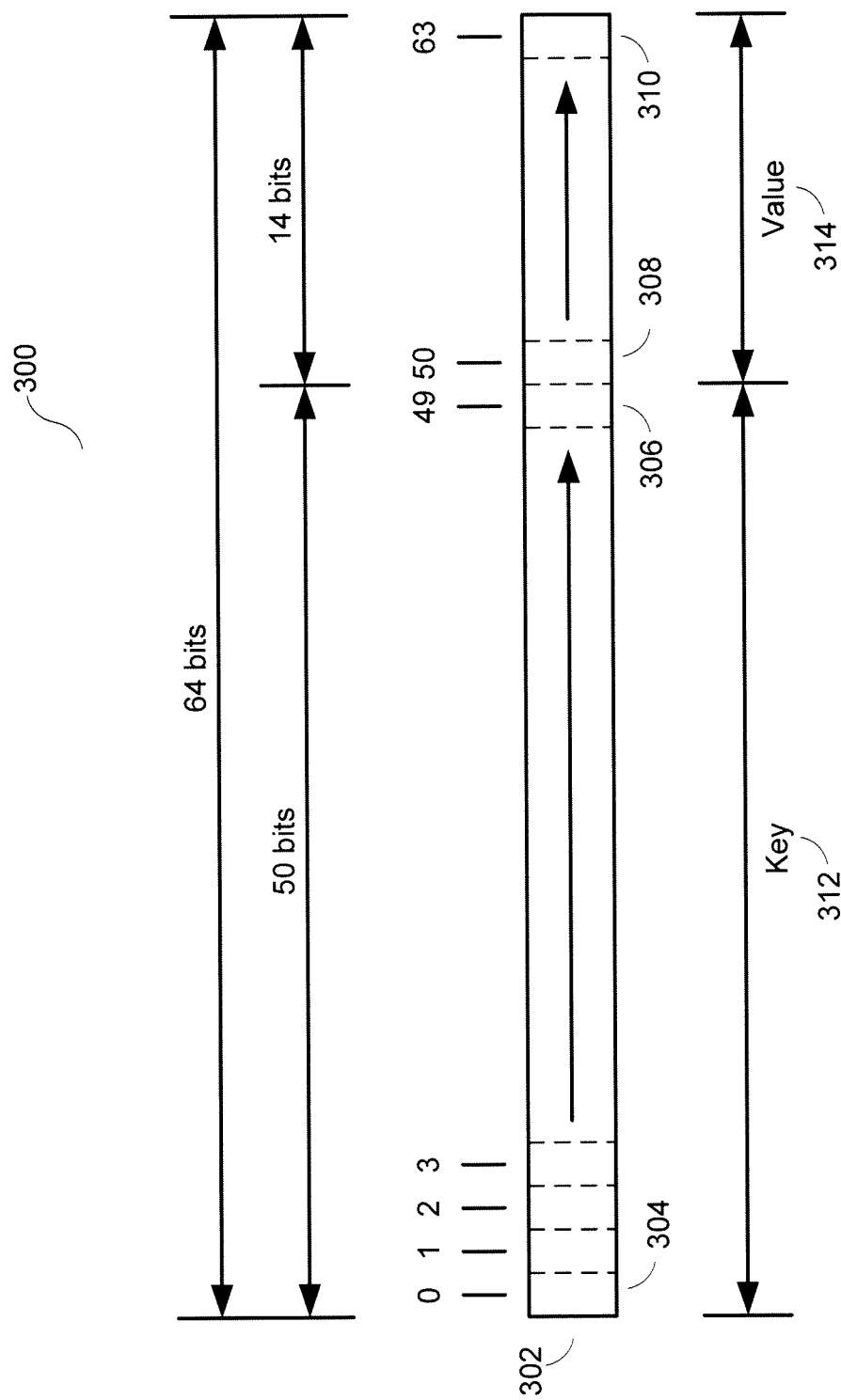
FIG. 3 depicts an exemplary data value arrangement.

As illustrated by FIG. 3 and reference numeral 300, if one selects a 64-bit data value 302 as a consolidated store (i.e., e.g., as an individual entry in a CAR) and one allocates 50 bits (304→306) of the available 64 bits to key (i.e., address such as TN) storage 312 then one can store a maximum of 2^50 or 1,125,899,906,842,624 addresses (i.e., TNs). Such an allocation can encompass the entirety of E.164-compliant TNs.

As illustrated by FIG. 3 and reference numeral 300 the balance of the 64-bit data value (i.e., 64 bits−50 bits=14 bits [308→310]) provides 2^14 or 16,384 different values 314 (which in the instant example are identifiers that indicate the carrier [e.g., WC, landline carrier, etc.] that services or that is otherwise associated with an address [e.g., TN]).

A CAR configured as described above may be populated with information from one or more classes of data. For example, for geographic zone one (NANP-compliant) TNs information may come from possibly inter alia:

1) Static Data. Examples of this class of data may include for example Easily-Recognizable Codes (ERCs) such as toll-free TNs, premium-rate TNs, etc.; the Local Exchange Routing Guide (LERG); etc.

2) Dynamic Data. Examples of this class of data may include for example broadcasts from one or more Number Portability Administration Centers (NPACs); real-time data feeds from carriers (e.g., WCs, landline carriers, etc.); results returned to a RTQF; etc.

3) Other. Examples of this class of data may include for example manual updates, corrective entries, etc.

It will be obvious to one or ordinary skill in the art that a wide number of equivalent classes of data may be available for each of the other geographic zones two through nine.

Figure 4:
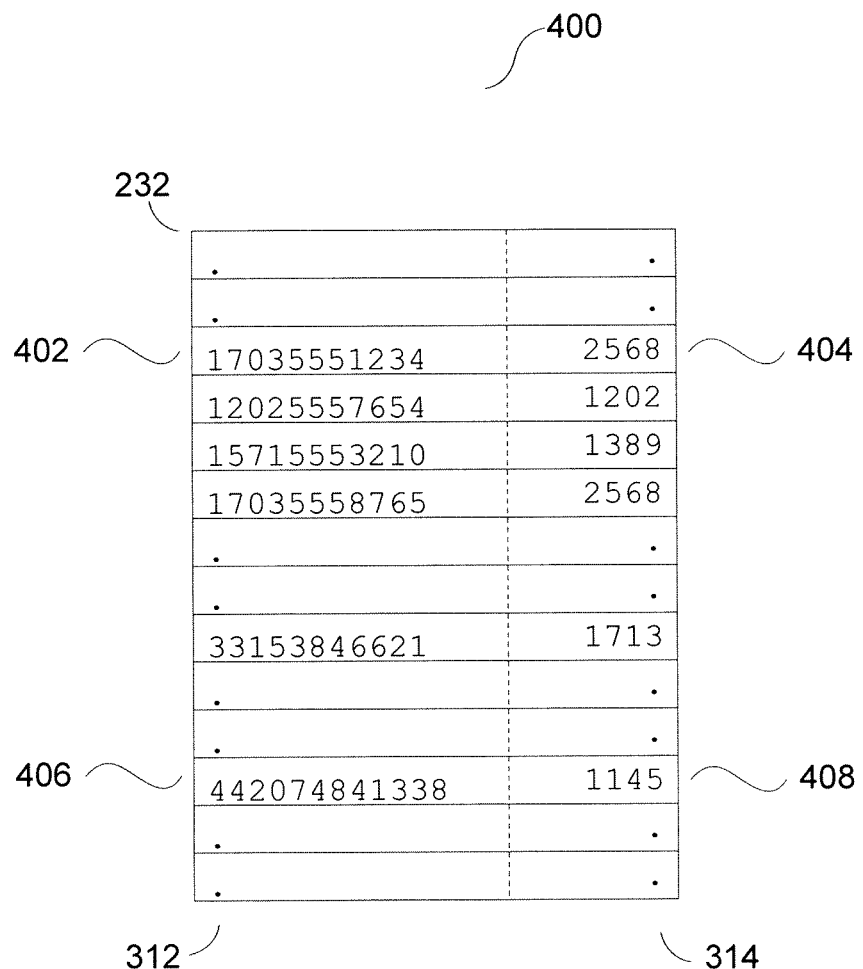
FIG. 4 depicts aspects of an exemplary Comprehensive Address Repository (CAR).

FIG. 4 and reference numeral 400 depict aspects of a CAR 232 that is based on possibly inter alia aspects of the above discussion. Each entry in the CAR 232 consists of a key (e.g., an address such as a TN) 312 and an associated value (e.g., a carrier indicator) 314. For example, a query to the illustrated CAR 232 for the TN 17035551234 (see 402) would return the carrier indicator 2568 (see 404) and a query for the TN 442074841338 (see 406) would return the carrier indicator 1145 (see 408).

It will be obvious to one or ordinary skill in the art that numerous alternatives to the architecture that was described above are easily possible. Among other things one might support different, perhaps mixed, key (address) types (e.g., TNs, SCs, IP addresses, E-Mail addresses, etc.); one might employ a different (e.g., 128-bit, etc.) data value as a consolidated store (i.e., as an individual entry in a CAR); one might employ a different (e.g., WC, landline carrier, etc.) indicator scheme; one might associate additional information (beyond a [e.g., WC, landline carrier, etc.] indicator) to a key (address); etc.

Returning to FIG. 2, it will be readily apparent to one of ordinary skill in the relevant art that within a MPI numerous other components and/or numerous alternative component arrangements, beyond that which was described above, are easily possible. For example:

1) A Gateway may maintain one or more repositories (including possible inter alia a Message Detail Record [MDR] repository) into which selected details of all administrative, processing, etc. activities may be recorded. Among other things, such a repository may be used to support scheduled (e.g., daily, weekly, etc.) and/or on-demand reporting with report results delivered (to, for example, an Entity [$E_1$ 204→$E_n$ 210]) through, possibly inter alia, any combination of one or more channels such as the World Wide Web (WWW via, for example, a dedicated Web site), wireless messaging (SMS, MMS, etc.), Electronic Mail (E-Mail) messages, Instant Messaging (IM), conventional mail, telephone, Interactive Voice Response (IVR) facility, etc.

2) The different repositories that are depicted in FIG. 2 (including inter alia a CAR 232; CAR Backstorage 234; details of administrative, processing, etc. activities; etc.) are logical representations of the possibly multiple physical repositories that might be implemented. The physical repositories may be implemented through any combination of conventional Relational Database Management Systems (RDBMSs) such as Oracle, through Object Database Management Systems (ODBMSs), through in-memory Database Management Systems (DBMSs), through in-memory data structures, or through any other equivalent facilities.

Within a MPI flexible, extensible, and dynamically updatable configuration information may allow a WF component to be quickly and easily realized to support any number of activities. For example, WFs might be configured to support various internal processing steps (please see below); to support the generation and dispatch of response, etc. messages; to support various billing transactions; to support the generation of scheduled and/or on-demand reports; etc. The specific WFs that were just described are exemplary only; it will be readily apparent to one of ordinary skill in the relevant art that numerous other WF arrangements, alternatives, etc. are easily possible. Under different embodiments of aspects of the present invention aspects of one or more WF chains within a MPI may be implemented using the Java programming language.

An illustrative internal processing sequence, that may be realized as a WF, might include the following steps:

1) Retrieve an incoming message from an IQ.

2) Based on a set of flexible, extensible, and dynamically configurable rules extract various data elements from the incoming message and preserve the data elements in a message, protocol, etc. neutral Internal Message Object (IMO).

3) Based on a set of flexible, extensible, and dynamically configurable rules process the IMO. For example, through (possibly inter alia) the CAR resolve possibly among other things the message's destination address (to identify, possibly inter alia, a destination WC).

4) Using a set of flexible, extensible, and dynamically configurable rules complete a route selection process. Such a process may include or consider, possibly inter alia, any number of data elements or fields in an IMO; system configuration information such as defined delivery paths; constraints such as Day of Week (DoW), Time of Day (ToD), etc.; factors such as current system loads and Quality of Service (QoS) levels; paradigms such as Least Cost Routing (LCR); etc. Such a process may include one or more defined 'hooks' to support, possibly inter alia, various billing events. The generated Route Selection may be preserved by, possibly inter alia, recording it in a MDR repository.

5) From the IMO construct an outgoing message and, based on possibly inter alia the Route Selection, deposit the outgoing message on an OQ. Various of the particulars of the outgoing message may be preserved by, possibly inter alia, updating one or more entries in a MDR repository.

The specific processing activities that were described above are illustrative only and it will be readily apparent to one of ordinary skill in the relevant art that numerous other processing activities are easily possible and indeed are fully within the scope of the present invention.

The processing activities that were described above may be implemented through, and consequently supported by, any combination of a number of technologies, etc. For example:

1) An IMO may be implemented through any combination of a number of facilities including, possibly inter alia, flat files, in-memory data structures, etc. For example, within a Java environment an IMO might be implemented as a Java Message Service (JMS) object with, possibly inter alia, various data elements or fields realized as individual JMS object properties.

2) The flexible, extensible, and dynamically configurable rules that were described above (e.g., for data element extraction, for IMO processing, for route selection processing, etc.) may be implemented through any combination of a number of facilities including, possibly alia, conventional programming constructs (such as, for example, C, Java, C++, Perl, etc.), regular expressions, custom or proprietary solutions, etc.

During Step 3 of the processing activities that were described above a CAR may be queried to determine the entity (e.g., WC) that currently services or that is otherwise associated with a message's destination address (e.g., TN). Given the very high volume of messaging traffic that would likely flow through a MPI, the CAR—along with the WF elements that surround the CAR and interact with it—would need to efficiently handle many tens-of-thousands of lookup operations each second.

Consequently aspects of the present invention employ an innovative highly-efficient double hash operation, with optional open addressing for the resolution of collisions, as an access mechanism to a CAR. A Java class (FastHashTable, which may be included as part of a Java-based MPI WF chain) that includes such a hash mechanism, that is destined to operate within a 64-bit processing environment, and which follows aspects of FIG. 3 as described above, may contain possibly inter alia:

1) A set of definitional constants. See for example FIG. 5 and reference numeral 500.

2) As illustrated by FIG. 6 and reference numeral 600, a set of private variables including, for example, a CAR (i.e., table 602).

3) A constructor method. See for example FIG. 7 and reference numeral 700.

4) As illustrated by FIG. 8 and reference numeral 800, a put method that accepts a key (e.g., address such as TN) and a value (e.g., carrier indicator) and which, after completing one or more hash operations and key comparison operations, appropriately updates a CAR to store/preserve the presented key and value.

5) As illustrated by FIG. 9 and reference numeral 900, a get method that accepts a key (e.g., address such as TN) and, after completing one or more hash operations and key comparison operations, returns the value (e.g., carrier indicator) that is associated with the key.

6) A series of support routines. See for example FIG. 10 and reference numeral 1000 and FIG. 11 and reference numeral 1100. Of interest and note are for example the central method doubleHash 1106, and the subordinate methods firstHash 1102 and secondHash 1104, which implement the double hash operation that was described above.

It will be readily apparent to one of ordinary skill in the relevant art that (1) numerous other constants, variables, methods, etc. may be defined within a Java class as described above and (2) numerous other Java classes, each with their own elements, arrangements, etc., are easily possible.

To help illustrate aspects of the operation of the Java class that was described above consider the application program log file snippets that are presented in FIG. 12 (and reference numeral 1200) and FIG. 13 (and reference numeral 1300). In the instant example log file snippets SCs are employed as keys (i.e., addresses) but it will be clear to one of ordinary skill in the art that other key types (such as inter alia TNs, etc.) are also possible.

In FIG. 12:

1) Reference numeral 1202 captures various of the processing activities that may take place as a new entry (consisting of the key [e.g., address such as SC] 100002 and the value [e.g., carrier indicator] 13) is added to a CAR through the command:

returnStatus=put (100002, 13);

Following completion of the processing activities the CAR would contain at index (e.g., position) 1 an entry containing the key 100002 and the value 13.

2) Reference numeral 1204 captures various of the processing activities that may take place as a new entry (consisting of the key [e.g., address such as SC] 999930 and the value [e.g., carrier indicator] 22) is added to a CAR through the command:

returnStatus=put (999930, 22);

Following completion of the processing activities (including inter alia multiple hash operations) the CAR would contain at index (e.g., position) 2 an entry containing the key 999930 and the value 22.

In FIG. 13:

1) Reference numeral 1302 captures various of the processing activities that may take place as a CAR is queried for the key (e.g., address such as SC) 100002 through the command:

returnValue=get (100002);

After locating the key 100002 at index (e.g., position) 1 of the CAR the value (i.e., 13) that is associated with that key is returned and preserved in the variable returnValue.

2) Reference numeral 1304 captures various of the processing activities that may take place as a CAR is queried for the key (e.g., address such as SC) 999930 through the command:

returnValue=get (999930);

After locating the key 999930 at index (e.g., position) 2 of the CAR (through inter alia multiple hash operations) the value (i.e., 22) that is associated with that key is returned and preserved in the variable returnValue.

The advantages, benefits, etc. of the model that has been described above include, possibly inter alia:

1) Performance. For example, a physical realization of aspects of the present invention in support of the resolution of TNs (a) included a 16 Gb CAR capable of housing the entirety of E.164-compliant TNs and (b) serviced over 80,000 inquiries each second.

2) Value-add services. For example, as noted previously a Gateway may maintain one or more repositories (e.g., a databases) into which selected details of all administrative, processing, etc. activities may be recorded to support the subsequent generation of scheduled (e.g., daily, weekly, etc.) and/or on-demand reports. Additionally, aspects of the present invention (including, possibly inter alia, the extraction of data elements from an incoming message, the processing of an IMO, etc.) may support enhanced troubleshooting, problem investigation, etc. capabilities within a MPI and those capabilities may, as just one example, be associated with different offered QoS levels (and possible charges for same—e.g., one may pay more for the faster, etc. routing of a message and pay less for the slower, etc. routing of a message).

3) Flexibility and extensibility. For example, dynamically configurable sets of rules (for, as an example, the extraction of data elements from an incoming message, the processing of an IMO, etc.) contribute significantly to a responsive, open, etc. MPI.

During the processing steps that were described above one or more billing transactions may optionally be completed—e.g., for each request that is received, for various of the processing steps that are performed, for each response returned, etc. A billing transaction may take any number of forms and may involve different external entities (e.g., a WC's billing system, a carrier billing system service bureau, a credit or debit card clearinghouse, etc.). A billing transaction may include, possibly inter alia:

1) The appearance of a line item charge on the bill or statement that, for example, an Entity may receive from their WC. Exemplary mechanics and logistics associated with this approach are described in pending U.S. patent application Ser. No. 10/837,695 entitled "SYSTEM AND METHOD FOR BILLING AUGMENTATION." Other ways of completing or performing line item billing are easily implemented by those skilled in the art.

2) The charging of a credit card or the debiting of a debit card.

3) The charging of an internal account.

4) The generation of aspects of an invoice.

The report, etc. messages that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS] facility).

The report, etc. messages may optionally contain advertising—e.g., textual material if a simple paradigm (such as SMS) is being utilized, or multimedia (images of brand logos, sound, video snippets, etc.) material if a more capable paradigm (such as MMS) is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The report, etc. messages may optionally contain promotional materials (e.g., still images, video clips, etc.).

While the discussion that was just presented included a double hash operation with optional open addressing for the resolution of collisions it will be apparent to one of ordinary skill in the relevant art that numerous other operations (including inter alia one-way functions, digest calculations, etc.) and/or collision resolution mechanisms (including inter alia chaining, the use of buckets, etc.) are easily possible and indeed are fully within the scope of the present invention.

The discussion that was just presented described a single CAR. However, it is to be understood that it would be readily apparent to one of ordinary skill in the relevant art that numerous other CAR arrangements (including inter alia multiple CARs organized in a distributed fashion, organized hierarchically, etc.) are easily possible (for reasons of inter alia performance, reliability, size, administration, etc.) and indeed are fully within the scope of the present invention.

The discussion that was just presented included TNs. However, it is to be understood that it would be readily apparent to one of ordinary skill in the relevant art that numerous other addresses or identifiers (such as possibly inter alia SCs, IP addresses, E-Mail addresses, IM handles, Session Initiation Protocol [SIP] addresses, etc.) are easily possible and indeed are fully within the scope of the present invention.

The discussion that was just presented referenced two specific wireless messaging paradigms—SMS and MMS. These paradigms potentially offer an incremental advantage over other paradigms; for example, native support for SMS and MMS is commonly found on a WD that a potential MS would be carrying. However, it is to be understood that it would be readily apparent to one of ordinary skill in the relevant art that numerous other paradigms (such as, possibly inter alia, IMS, etc.) are fully within the scope of the present invention.

The foregoing disclosure of the preferred embodiments of the present invention has been presented for purposes of illustration and description. It is not intended to be exhaustive or to limit the invention to the precise forms disclosed. It will be readily apparent to one of ordinary skill in the relevant art that numerous alternatives to the presented embodiments are easily possible and, indeed, are fully within the scope of the present invention.

The following list defines acronyms as used in this disclosure.

| Acronym | Meaning |
| --- | --- |
| A2P | Application-to-Peer |
| API | Application Programming Interface |
| CAR | Comprehensive Address Repository |

-continued

| Acronym | Meaning |
|---|---|
| CP | Content Provider |
| DBMS | Database Management System |
| DoW | Day of Week |
| E-Mail | Electronic Mail |
| ENUM | Electronic Numbering |
| ERC | Easily-Recognizable Code |
| IM | Instant Messaging |
| IMO | Internal Message Object |
| IMS | IP Multimedia Subsystem |
| IP | Internet Protocol |
| IQ | Incoming Queue |
| ITU | International Telecommunication Union |
| IVR | Interactive Voice Response |
| JMS | Java Message Service |
| LBS | Location-Based Service |
| LCR | Least Cost Routing |
| LERG | Local Exchange Routing Guide |
| MDR | Message Detail Repository |
| MICV | Messaging Inter-Carrier Vendor |
| MMS | Multimedia Message Service |
| MNP | Mobile Number Portability |
| MPI | Message Processing Infrastructure |
| MS | Mobile Subscriber |
| NANP | North American Numbering Plan |
| NANPA | NANP Administration |
| NRO | Number Resource Optimization |
| ODBMS | Object Database Management System |
| OQ | Outgoing Queue |
| P2P | Peer-to-Peer |
| QoS | Quality of Service |
| RDBMS | Relational Database Management System |
| RTQF | Real-Time Query Facility |
| SC | Short Code |
| SIP | Session Initiation Protocol |
| SMS | Short Message Service |
| SP | Service Provider |
| SS7 | Signaling System Number 7 |
| TCP | Transmission Control Protocol |
| TN | Telephone Number |
| ToD | Time of Day |
| TPF | Transaction Processing Facility |
| UDP | User Datagram Protocol |
| WC | Wireless Carrier |
| WD | Wireless Device |
| WF | WorkFlow |
| WWW | World Wide Web |

What is claimed is:

1. A method for resolving an address of a message, the method comprising:
   receiving the message at a gateway, the message comprising the address, wherein the address is a telephone number; and
   performing within a computer-implemented processing environment a series of operations including:
   (a) setting a counter to zero,
   (b) completing a double hash operation yielding an index, the double hash operation having as operands the address, the counter, and a size of a Consolidated Address Repository (CAR),
   (c) retrieving a record from a location in the CAR indicated by the index, the record comprising a key portion and a value portion,
   (d) recovering the key portion from the record and confirming that the key portion matches the address and, when a match is not found, completing a collision resolution process comprising incrementing the counter by one and repeating steps (b) through (d), and
   (e) when a match is found recovering the value portion from the record, wherein the value portion identifies an entity that services the telephone number.

2. The method of claim 1, wherein the message is a Short Message Service (SMS) message.

3. The method of claim 1, wherein the telephone number is E.164 compliant.

4. The method of claim 1, wherein the double hash operation comprises a first hash operation and a second hash operation.

5. The method of claim 4, wherein one or both of the first hash operation and the second hash operation comprise modular arithmetic.

6. The method of claim 5, wherein the modulus is based on at least the size of the CAR.

7. The method of claim 1, wherein the record is 64 bits long.

8. The method of claim 1, wherein the key portion and the value portion exist in the record in an encoded form.

9. A system for resolving an address of a message, the system comprising:
   a gateway, the gateway capable of receiving the message, wherein the message comprises the address and the address is a telephone number; and
   a computer-implemented processing environment, the computer-implemented processing environment capable of performing a series of operations including:
   (a) setting a counter to zero,
   (b) completing a double hash operation yielding an index, the double hash operation having as operands the address, the counter, and a size of a Consolidated Address Repository (CAR),
   (c) retrieving a record from a location in the CAR indicated by the index, the record comprising a key portion and a value portion,
   (d) recovering the key portion from the record and confirming that the key portion matches the address and, when a match is not found, completing a collision resolution process comprising incrementing the counter by one and repeating steps (b) through (d), and
   (e) when a match is found recovering the value portion from the record, wherein the value portion identifies an entity that services the telephone number.

10. The system of claim 9, wherein the message is a Short Message Service (SMS) message.

11. The system of claim 9, wherein the telephone number is E.164 compliant.

12. The system of claim 9, wherein the double hash operation comprises a first hash operation and a second hash operation.

13. The system of claim 12, wherein one or both of the first hash operation and the second hash operation comprise modular arithmetic.

14. The system of claim 13, wherein the modulus is based on at least the size of the CAR.

15. The system of claim 9, wherein the record is 64 bits long.

16. The system of claim 9, wherein the key portion and the value portion exist in the record in an encoded form.

* * * * *